United States Patent
Tsuji et al.

(10) Patent No.: US 10,465,266 B2
(45) Date of Patent: Nov. 5, 2019

(54) HEAT-RESISTANT TUNGSTEN ALLOY, FRICTION STIR WELDING TOOL, AND PRODUCTION METHOD

(71) Applicant: A.L.M.T. Corp., Tokyo (JP)

(72) Inventors: Ayuri Tsuji, Toyama (JP); Shigekazu Yamazaki, Toyama (JP); Akihiko Ikegaya, Toyama (JP); Noboru Uenishi, Toyama (JP)

(73) Assignee: A.L.M.T. CORP., Tokyo (JP)

( * ) Notice: Subject to any disclaimer, the term of this patent is extended or adjusted under 35 U.S.C. 154(b) by 37 days.

(21) Appl. No.: 15/314,671

(22) PCT Filed: May 22, 2015

(86) PCT No.: PCT/JP2015/064705
§ 371 (c)(1),
(2) Date: Nov. 29, 2016

(87) PCT Pub. No.: WO2015/182497
PCT Pub. Date: Dec. 3, 2015

(65) Prior Publication Data
US 2017/0191148 A1    Jul. 6, 2017

(30) Foreign Application Priority Data
May 30, 2014    (JP) .................................. 2014-112846

(51) Int. Cl.
*C22C 27/04* (2006.01)
*B22F 1/00* (2006.01)
(Continued)

(52) U.S. Cl.
CPC ................ *C22C 27/04* (2013.01); *B22F 1/00* (2013.01); *B22F 3/10* (2013.01); *B23K 20/12* (2013.01); *C22C 32/00* (2013.01)

(58) Field of Classification Search
CPC .. B23K 20/12; B23K 20/122; B23K 20/1225; B23K 20/1285; B23K 2210/20;
(Continued)

(56) References Cited

U.S. PATENT DOCUMENTS 5,149,361 A * 9/1992 Iyori ...................... C22C 29/00
75/233
2004/0238599 A1  12/2004 Subramanian et al.
(Continued)

FOREIGN PATENT DOCUMENTS

EP         2792759 A1   10/2014
JP      58130246 A  *  8/1983  ............. C22C 29/00
(Continued)

OTHER PUBLICATIONS

Derwent Summary JP 58-130246 Sintered body used as machining tool contains titanium, zirconium and/or hafnium, niobium and/or tantalum, carbon, nitrogen, boron and tungsten (Year: 2019).*

(Continued)

*Primary Examiner* — Alexandra M Moore
(74) *Attorney, Agent, or Firm* — Baker Botts L.L.P.; Michael A. Sartori

(57) ABSTRACT

The present heat-resistant tungsten alloy has a first phase containing W as a major component, a second phase having a carbonitride of at least one element of Ti, Zr and Hf and containing the carbonitride as a major component when W is removed, and a third phase having a carbide of at least one element of group 5A elements in the periodic table and containing the carbide as a major component when W is removed, the heat-resistant tungsten alloy having a Vickers hardness of 550 Hv or more at a room temperature, a displacement of 1 mm or more when leading to fracture, as determined in a three point bending test at 1200° C., and a (Continued)

0.2% proof stress of 900 MPa or more, as determined in the three point bending test at 1200° C.

8 Claims, 7 Drawing Sheets

(51) Int. Cl.
  *B22F 3/10* (2006.01)
  *B23K 20/12* (2006.01)
  *C22C 32/00* (2006.01)

(58) Field of Classification Search
  CPC ... B29C 35/0255; B29C 65/06; B65B 13/322; B65B 51/222; Y10T 428/213; C22C 27/00; C22C 27/04; C22C 29/00; C22C 29/02; C22C 29/04; C22C 29/10; C22C 32/00; C22C 32/0005; C22C 32/0031; C22C 32/0047; C22C 32/0089
  See application file for complete search history.

(56) References Cited

U.S. PATENT DOCUMENTS

| | | | |
|---|---|---|---|
| 2005/0129565 A1* | 6/2005 | Ohriner | C22C 27/04 420/431 |
| 2006/0249556 A1 | 11/2006 | Subramanian et al. | |
| 2007/0034048 A1* | 2/2007 | Liu | C22C 1/05 75/236 |
| 2008/0142572 A1 | 6/2008 | Fujii et al. | |
| 2008/0185078 A1 | 8/2008 | Ishida et al. | |
| 2008/0190907 A1 | 8/2008 | Fujii et al. | |
| 2010/0279146 A1* | 11/2010 | Rowe | B23K 20/1255 428/650 |
| 2011/0062214 A1 | 3/2011 | Park et al. | |
| 2013/0240607 A1 | 9/2013 | Park et al. | |
| 2013/0341376 A1* | 12/2013 | Miyazaki | B23K 20/1255 228/2.1 |
| 2014/0007995 A1 | 1/2014 | Ishida et al. | |
| 2014/0147327 A1 | 5/2014 | Kurishita et al. | |
| 2014/0356215 A1 | 12/2014 | Yamazaki et al. | |

FOREIGN PATENT DOCUMENTS

| | | |
|---|---|---|
| JP | S59-229430 A | 12/1984 |
| JP | H06-279911 A | 10/1994 |
| JP | 2003-532543 A | 11/2003 |
| JP | 2004-090050 A | 3/2004 |
| JP | 2004-358556 A | 12/2004 |
| JP | 2009-255170 A | 11/2009 |
| JP | 2010-520810 A | 6/2010 |
| JP | 2011-062731 A | 3/2011 |
| JP | 2013-249512 A | 12/2013 |
| JP | 2015-067868 A | 4/2015 |
| WO | 01/85385 A1 | 11/2001 |
| WO | 2005/105360 A1 | 11/2005 |
| WO | 2007/032293 A1 | 3/2007 |
| WO | 2008/102209 A2 | 8/2008 |
| WO | 2013/089176 A1 | 6/2013 |
| WO | 2013/089177 A1 | 6/2013 |

OTHER PUBLICATIONS

ProQuest Patents Machine Translation JP 58-130246. Sintered Material for Cutting Tool Having Excellent High Temperature Characteristic and Its Production (8308). Retrieved from https://dialog.proquest.com/professional/docview/1385996502?accountid=161361 (Year: 2019).*

Office Action issued in Japanese Patent Application No. 2016-523461, dated Jul. 5, 2017.

Search Report issued in European Patent Application No. 15799231.4, dated Dec. 15, 2017.

Murakami et al., "Friction and wear properties of Fe—Mo intermetallic compounds under oil lubrication," Intermetallics, vol. 15 (2007) pp. 1573-1581.

"Phase Diagrams of Binary Tungsten Alloys," The Indian Institute of Metal (1991) p. 89.

Tsuji et al., "Comparision of mechanical characteristics of Mo having hard particles added thereto and W sintered alloy," Japan Society of Powder and Powder Metallurgy, collected papers of lectures in autumn meeting in 2013, p. 139.

International Search Report in counterpart International Patent Application No. PCT/JP2015/064705, dated Aug. 25, 2015.

* cited by examiner

HEAT-RESISTANT TUNGSTEN ALLOY, FRICTION STIR WELDING TOOL, AND PRODUCTION METHOD

TECHNICAL FIELD

The present invention relates to a plastic working tool used in a high temperature environment, and particularly to a heat-resistant tungsten alloy suitable for a friction stir welding tool and a friction stir welding tool using the same, and a method for producing the heat-resistant tungsten alloy.

BACKGROUND ART

In recent years, there is a demand for a heat-resistant alloy suitably used to extend the life-span of a plastic working tool used in a high temperature environment, such as a die for hot extrusion, a piercer plug for a seamlessly produced pipe, and a hot runner nozzle for injection molding.

In recent years, friction stir welding (FSW) has been increasingly developed, and for a rotating tool used therefor, in order to extend friction stir welding's applicability, a material which is high in high temperature strength and room temperature hardness is increasingly developed.

Friction stir welding is a method in which a rotating tool is pressed against a welding portion of a metallic member to cause frictional heat, which softens a material to be welded and the material is caused to plastically flow and thus welded. Friction stir welding has already been increasingly practically used in welding a low melting point, soft material such as aluminum and magnesium and its applicability is extended. Currently, however, in order to contemplate application to a higher melting point and harder material to be welded, there is a demand for developing a tool which has a working life with enhanced high temperature strength and enhanced wear resistance.

This is because in FSW when a tool is used to cause frictional heat to soften a material to be welded, in general, the tool's temperature can increase to reach around 70% of the material's melting point, although there is a difference depending on the welding condition(s) and the material to be welded. In other words, for aluminum having a low melting point, this temperature is approximately 400° C., whereas for iron steel material, it reaches 1000 to 1200° C., and accordingly, the tool's material is required to have high temperature strength, toughness, and wear resistance which also allows the material to be welded to plastically flow in this temperature range. This is an issue common to tools used in FSW, FSJ (friction point joining), and friction stirring-applied technology.

Furthermore, a material used for a friction stir welding tool and a hot working tool is required to have wear resistance and defect resistance, and hence not only strength and hardness but also toughness. While W- and Mo-based heat-resistant alloys are mentioned as a heat-resistant material that has been proposed, the inventors have also found that, by adding TiCN to Mo, an alloy which presents an excellent high temperature characteristic is obtained, and as a result of diligent development, by adjusting the amount of TiCN added, the inventors has succeeded in developing a material which is balanced in hardness and strength, and toughness (see patent document 1).

On the other hand, an application in which W- and Mo-based heat-resistant alloys are used as a tool material is often a case in which an iron-based material is assumed as a workpiece, and carbon steel and stainless steel have high deformation resistance, in particular, and accordingly, are regarded as a less workable material. When an iron-based material is subjected by a tool to hot plastic working, the tool in use reaches a temperature around 1000° C., and when a tool with a Mo-based matrix is used, Fe mainly contained in the material to be processed reacts with Mo mainly contained in the tool, and a Fe—Mo-based intermetallic compound may be formed on a surface of the tool. Inter alia, $Fe_7Mo_6$ (μ phase) is known to have a hard and brittle nature (see Non-Patent Documents 1 and 2), and when it is formed on a surface of the tool this intermetallic compound phase drops and can thus be a cause of wearing the tool in an increased amount, and accordingly, when an iron-based material is a workpiece, a composition which does not form an intermetallic compound phase is more desirable.

For this, it can be seen from a phase diagram that W similarly known as a refractory material does not form an intermetallic compound in the temperature range in which the tool is used, and using a W-based alloy can prevent an intermetallic compound phase from being formed even when a workpiece is an iron-based material.

As a tool for a friction stir welding a refractory material, a W-based alloy has already attracted attention, and a W—Re alloy and a composite material with a hard material, or a W—Re material (see patent document 2), W-PcBN (see patent document 3) and the like have been developed. Furthermore, friction stir welding tools have been developed of a Co based alloy (patent documents 4 and 5), a W—TiCN alloy (patent document 6 and nonpatent document 3), a Ni based superalloy (patent document 7), an Ir alloy (patent document 8) and silicon nitride (patent document 9).

CITATION LIST

Patent Documents

Patent document 1: Japanese Patent Laying-Open No. 2013-249512

Patent document 2: Japanese Patent Laying-Open No. 2004-358556

Patent document 3: Japanese National Patent Publication No. 2003-532543

Patent document 4: WO 2007/032293

Patent document 5: Japanese Patent Laying-Open No. 2011-62731

Patent document 6: Japanese Patent Laying-Open No. 06-279911

Patent document 7: Japanese Patent Laying-Open No. 2009-255170

Patent document 8: Japanese Patent Laying-Open No. 2004-90050

Patent document 9: WO 2005/105360

Nonpatent Documents

Nonpatent document 1: Intermetallics, Vol. 15 (2007) 1573-1581

Nonpatent document 2: Phase Diagrams of Binary Tungsten Alloys, Indian Institute of Metal (1991) 89

Nonpatent document 3: Tsuji, Yamazaki, Takita, and Ikegaya "comparison of mechanical characteristics of Mo having hard particles added thereto and W sintered alloy," Japan Society of Powder and Powder Metallurgy, collected papers of lectures in autumn meeting in 2013

SUMMARY OF INVENTION

Technical Problem

Thus, a variety of materials has been developed as a material for a friction stir welding tool used to weld an iron-based material.

However, the above materials have the following problem:

Initially, W—Re is excellent in toughness, however, it is easily worn, and PcBN is excellent in wear resistance, however, it is prone to breakage. W—Re/PcBN is a significantly excellent material which co-establishes defect resistance and wear resistance, however, it is expensive and thus poor in practicability.

Co based alloy is effective in welding a titanium alloy, however, it is insufficient in wear resistance in welding stainless steel and thus inapplicable.

Ni based superalloy is low in hardness at high temperature and thus insufficient as a wear resistant material.

Furthermore, Ir alloy is difficult to be put in practical use as a refractory alloy material of Ir is expensive.

Furthermore, silicon nitride is effective in welding a thin plate of stainless steel, however, it has a large possibility of breakage due to an increased probe length in welding a thick plate exceeding 5 mm.

W—TiCN alloy is a material excellent in that by adding TiCN, room temperature hardness and high temperature strength can be improved without decreasing ductility.

On the other hand, there is a limit in the amount of TiCN added in the range which does not decrease ductility, and furthermore, when a W—TiCN alloy is used as a tool for friction stir welding an iron-based material, the tool may be plastically deformed by deformation resistance, resulting in the tool having a reduced lifetime.

Thus, conventional materials for a friction stir welding tool still have a room for improvement when an iron-based material is a target to be welded.

The present invention has been made in view of the above issue, and an object thereof is to provide a heat-resistant tungsten alloy provided for a plastic working tool and satisfying both a physical property such as proof stress and hardness corresponding to a workpiece and practicability.

Solution to Problem

In order to solve the above issue, the present inventors have again studied W—TiCN alloy.

As has been discussed above there is a limit in the amount of TiCN that can be added in the range which does not decrease ductility, and it has been believed to be difficult to achieve larger strength and large hardness by adding hard particles.

However, the present inventors have found that, by adding a carbonitride of Ti, Zr, Hf to W as hard particles to W at a prescribed ratio, and furthermore, adding a carbide of at least one element of group 5A elements in the periodic table, a heat-resistant material which can achieve large strength and large hardness can be obtained without extremely impairing ductility, and the present inventors have thus made the present invention.

That is, the present invention in a first manner is a heat-resistant tungsten alloy having a first phase containing W as a major component, a second phase having a carbonitride of at least one element of Ti, Zr and Hf and containing the carbonitride as a major component when W is removed, and a third phase having a carbide of at least one element of group 5A elements in the periodic table and containing the carbide as a major component when W is removed, the heat-resistant tungsten alloy having a Vickers hardness of 550 Hv or more at a room temperature, a displacement of 1 mm or more when leading to fracture, as determined in a three point bending test at 1200° C. (hereinafter this displacement will be referred to as fracturing flexure), and a 0.2% proof stress of 900 MPa or more, as determined in the three point bending test at 1200° C.

The present invention in a second manner is a friction stir welding tool having the heat-resistant tungsten alloy according to the first manner.

The present invention in a third manner is a friction stir welding device having the friction stir welding tool according to the second manner.

The present invention in a fourth manner is a method for producing the heat-resistant tungsten alloy according to the first manner, comprising: (a) mixing powdery W, a powdery carbonitride, and a carbide containing a group 5A element together; (b) compacting at room temperature a powdery mixture obtained in the (a); and (c) heating the compact obtained in the (b) in an atmosphere of atmospheric pressure at 1800° C. or more and 2000° C. or less to sinter the compact.

Advantageous Effect of Invention

The present invention can thus provide a heat-resistant tungsten alloy provided for a plastic working tool and satisfying both a physical property such as proof stress and hardness accommodating a workpiece having a high melting point and practicability more than conventional.

DESCRIPTION OF EMBODIMENTS

<Summary of the Subject Application>

Figure 1:
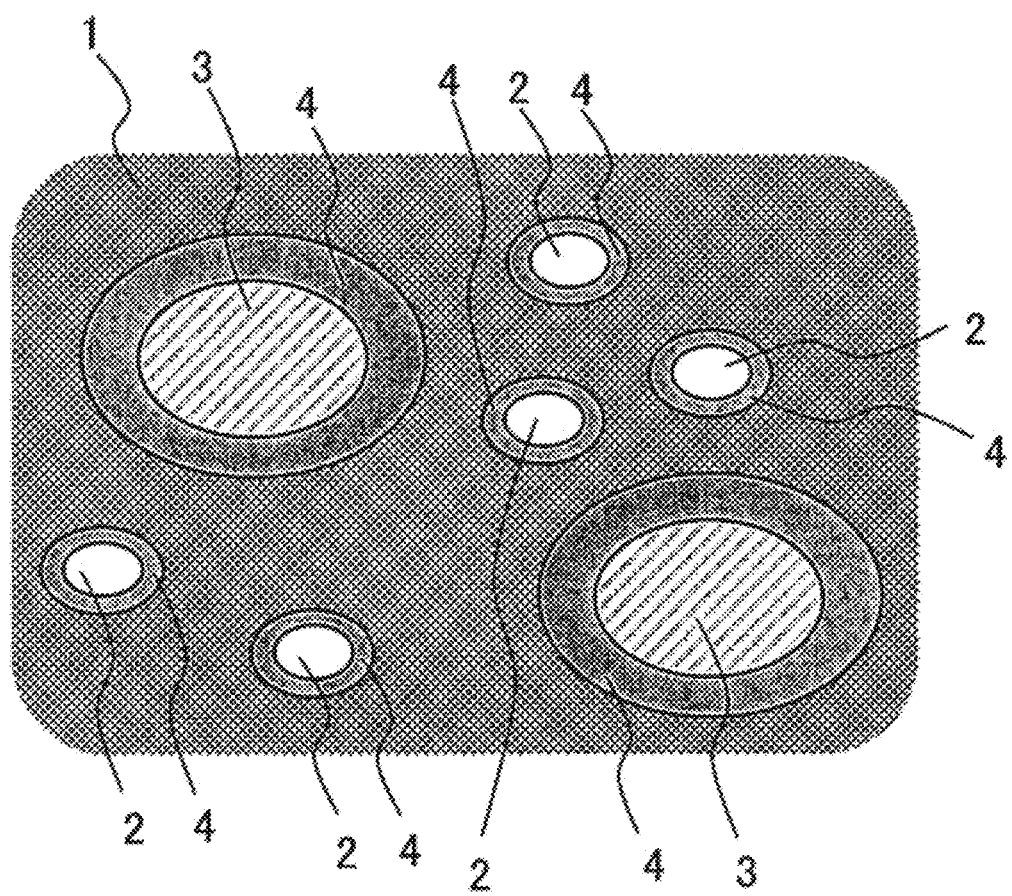
FIG. 1 is a schematic diagram of each phase in a heat-resistant tungsten alloy according to an embodiment of the present invention.

Initially, an embodiment of the present invention will be enumerated and described.

The present heat-resistant tungsten alloy has a first phase containing W as a major component, a second phase having a carbonitride of at least one element of Ti, Zr and Hf and containing the carbonitride as a major component when W is removed, and a third phase having a carbide of at least one element of group 5A elements in the periodic table and containing the carbide as a major component when W is removed, the heat-resistant tungsten alloy having a Vickers hardness of 550 Hv or more at a room temperature, a fracturing flexure of 1 mm or more, as determined in a three point bending test at 1200° C., and a 0.2% proof stress of 900 MPa or more, as determined in the three point bending test at 1200° C. Note that, in the present invention, "a Vickers hardness at a room temperature" means a Vickers hardness at 20° C.

Preferably, the above heat-resistant tungsten alloy has a Vickers hardness of 190 Hv or more at 1000° C. 190 Hv or more can suppress wear and deformation more when the heat-resistant tungsten alloy is used as a friction stir welding tool and the tool is used continuously.

Preferably, the above heat-resistant tungsten alloy contains a carbonitride of Ti, Zr, Hf in an amount equal to or greater than 5 volume % and equal to or less than 25 volume %. Having 5 volume % or more can enhance room temperature hardness, and 0.2% proof stress at high temperature. Furthermore, it can enhance high temperature strength. Having 25 volume % or less can suppress reduction in ductility.

Furthermore, preferably, the above heat-resistant tungsten alloy contains a carbide of V, Nb, Ta in a total amount equal to or greater than 0.5 volume % and equal to or less than 15 volume %. Having 0.5 volume % or more can enhance room temperature hardness, and 0.2% proof stress at high temperature. Furthermore, it can enhance high temperature strength. Having 15 volume % or less can suppress reduction in ductility.

Furthermore, preferably, the above heat-resistant tungsten alloy has the first phase, the second phase and the third phase with an average crystal grain size of 0.1 μm or more and 10 μm or less. Being 0.1 μm or more can suppress reduction in ductility. Being 10 μm or less can enhance room temperature hardness, and 0.2% proof stress at high temperature. Furthermore, it can enhance high temperature strength.

Furthermore, the present invention's friction stir welding tool is a friction stir welding tool which has the above-mentioned heat-resistant tungsten alloy.

Furthermore, the present invention's friction stir welding device is a friction stir welding device which has the above-mentioned friction stir welding tool.

Furthermore, the present invention's production method is a method for producing the above heat-resistant tungsten alloy, comprising: (a) mixing powdery W, a powdery carbonitride, and a carbide containing a group 5A element together; (b) compacting at room temperature a powdery mixture obtained in the (a); and (c) heating the compact obtained in the (b) in an atmosphere of atmospheric pressure at 1800° C. or more and 2000° C. or less to sinter the compact.

Hereafter, reference will be made to the drawings to describe an embodiment suitable for the present invention.

<Composition of Heat-resistant Tungsten Alloy>

Initially, a composition of a heat-resistant tungsten alloy used for a friction stir welding tool (or plastic working tool) according to an embodiment of the present invention will be described.

FIG. 1 is a schematic diagram of each phase in the heat-resistant tungsten alloy according to the embodiment of the present invention.

The heat-resistant tungsten alloy used for the friction stir welding tool according to the embodiment of the present invention has, as shown in FIG. 1, a first phase 1 containing W as a major component, a second phase 2 having a carbonitride of at least one element of Ti, Zr and Hf and containing the carbonitride as a major component when W is removed, and a third phase 3 having a carbide of at least one element of group 5A elements in the periodic table and containing the carbide as a major component when W is removed, the heat-resistant tungsten alloy having a Vickers hardness of 550 Hv or more at a room temperature, a fracturing flexure of 1 mm or more, as determined in a three point bending test at 1200° C., and having a 0.2% proof stress of 900 MPa or more, as determined in the three point bending test at 1200° C.

Furthermore, FIG. 1 also shows a fourth phase 4 which is a solid solution formed to surround second phase 2 and third phase 3.

Hereinafter, each phase and a material configuring it will be described.

<First Phase>

First phase 1 is a phase which contains W as a major component. A major component as referred to herein means a component which is largest in content (mass %) (this will also applies hereinafter).

Specifically, while first phase 1 is composed for example of W and an inevitable impurity, depending on the content of the carbonitride, carbide etc. described later, it may contain a solid solution of an element configuring the carbonitride, the carbide, etc.

W in first phase 1 has a high melting point and a large hardness and is excellent in strength at high temperature, and it is essential in order to allow the heat-resistant tungsten alloy to have a physical property as a metal.

<Second Phase>

Second phase 2 has a carbonitride of at least one element of Ti, Zr and Hf and contains the carbonitride as a major component when W is removed. Specifically, it is composed of the above carbonitride, W, and an inevitable impurity for example.

The carbonitride of Ti, Zr, Hf in second phase 2 is essential as it can be added to W to enhance room temperature hardness, and 0.2% proof stress at high temperature, as will be described later.

Note that TiCN is mentioned as a representative carbonitride, and as a composition of TiCN, what will be $TiC_xN_{1-x}$ (x=0.3-0.7) is for example mentioned, and specifically, $TiC_{0.3}N_{0.7}$, $TiC_{0.5}N_{0.5}$, $TiC_{0.7}N_{0.3}$, etc. are mentioned.

While among these, as a representative one, $TiC_{0.5}N_{0.5}$ is known, titanium carbonitride of a different composition, zirconium carbonitride, and hafnium carbonitride can also provide an effect similar to that of $TiC_{0.5}N_{0.5}$.

<Third Phase>

The third phase has a carbide of at least one element of group 5A elements in the periodic table and contains the carbide as a major component when W is removed. Specifically, it is composed of the above carbide, W, and an inevitable impurity for example.

As a specific example of the group 5A element in the periodic table, V, Nb, and Ta are mentioned.

Thus, not only adding Ti, Zr, Hf as an element of a carbonitride but also adding the above carbide to composite them together can more enhance room temperature hardness and high temperature strength while suppressing reduction in ductility due to addition of the element of the carbonitride than simply increasing an amount of the element of the carbonitride to be added. Accordingly, the group 5A element is essential.

This point will more specifically be described. Initially, a case where the carbonitride is TiCN will be considered. In this case, when aiming at enhancing a W—TiCN alloy's characteristic (or strength), adding TiCN in an increased amount is considered, however, when TiCN is added in an increased amount and Ti is contained in an amount exceeding 25 volume %, ductility is reduced, and when the alloy is applied to a tool, the tool may chip. Accordingly, by further adding hard particles other than TiCN to add the particles to TiCN to thus composite them together, a heat-resistant tungsten alloy which is enhanced in room temperature hardness and high temperature strength and also has ductility can be obtained. Note that a case where the carbonitride is ZrCN, HfCN is also similar to the case where the carbonitride is TiCN.

<Fourth Phase>

Fourth phase 4 is a layer formed to surround at least one of second phase 2 and third phase 3, and it contains as a major component a solid solution of W of first phase 1 and the carbonitride of second phase 2 or the carbide of third phase 3 and is composed of the solid solution and an inevitable impurity.

That is, fourth phase 4 surrounding second phase 2 is a solid solution in which the carbonitride is present at a higher ratio than first phase 1, and fourth phase 4 surrounding third phase 3 is a solid solution in which the carbide is present at a higher ratio than first phase 1.

Note that fourth phase 4 is not an essential constituent.

<Composition>

Desirably, the alloy contains the carbonitride of Ti, Zr, Hf in an amount equal to or greater than 5 volume % and equal to or less than 25 volume %. This is because a content less than 5 volume % may fail to sufficiently effectively enhance room temperature hardness, and 0.2% proof stress at high temperature, and a content exceeding 25 volume % may fail to sufficiently effectively suppress reduction in ductility, and when the alloy is applied to a tool, the tool may chip, easily crack and the like. Note that in the above range, a value of 5 volume % or more and 20 volume % or less is particularly desirable as it significantly suppresses reduction in ductility.

Furthermore, desirably, the group 5A carbide's content is equal to or greater than 0.5 volume % and equal to or less than 15 volume %. When the content of the group 5A carbide is less than 0.5 volume %, an effect by addition of a group 5A element to enhance room temperature hardness, and 0.2% proof stress at high temperature may insufficiently be obtained, and when the content of the group 5A carbide exceeds 15 volume %, an effect to suppress reduction in ductility may insufficiently be obtained. In order to further increase these effects, in the above range, being equal to or greater than 1 volume % and equal to or less than 13 volume % is more desirable.

In the present invention, the contents (in volume %) of the carbonitride of Ti, Zr, Hf and group 5A carbide are assumed to be values calculated in the following method: Initially, the elemental contents (in mass) of W, Ti, Zr, Hf and group 5A element contained in a sample of the heat-resistant tungsten alloy are measured. Subsequently, from the respective measured masses, assuming that W has its entire amount present as a metal, Ti, Zr, Hf each have its entire amount present as a carbonitride, and the group 5A element has its entire amount present as a carbide in the sample, the volumes of the W metal, carbonitride of Ti, Zr, Hf, and group 5A element carbide are calculated using their respective densities, and the total of their volumes is used as the sample's total volume to calculate the volume ratios of the carbonitride of Ti, Zr, Hf and group 5A element carbide (in volume %). As a method of measuring the above elemental contents (in mass), a method of measurement for example by ICP (Inductively Coupled Plasma) emission spectrometry can for example be used. Note that "the content of the carbonitride of Ti, Zr, Hf" in the present invention means a content as converted into $TiC_{0.5}N_{0.5}$, $ZrC_{0.5}N_{0.5}$, and $HfC_{0.5}N_{0.5}$.

<Inevitable Impurity>

The heat-resistant tungsten alloy used to form a friction stir welding tool according to the present invention contains the above-mentioned essential components, and in addition may contain an inevitable impurity.

As the inevitable impurity, there are Fe, Ni, Cr and other similar metal components, and C, N, O, etc.

<Crystal Grain Size>

Desirably, the first phase, the second phase, the third phase (and the fourth phase 4 if any) have an average crystal grain size of 0.1 µm or more and 10 µm or less.

By reducing the average crystal grain size of first phase 1 that is a main phase of the heat-resistant tungsten alloy, hardness and high temperature strength can be enhanced, however, when it is less than 0.1 µm, ductility is easily reduced and an effect to suppress reduction in ductility may insufficiently be obtained. Furthermore, in order to allow a sintered material to have a fine crystal grain size, a method to reduce a powdery source material in granularity is generally used, however, a fine powdery source material for the above average crystal grain size to be less than 0.1 µm is in reality difficult to avoid aggregation; rather, there is a possibility that an effect to enhance hardness and strength may be less easily obtained. Increasing the average crystal grain size of the first phase 1 as described above allows first phase 1 to have a continuous section increased in length and hence allows easy deformation, and can thus suppress reduction in ductility, however, when 10 µm is exceeded, an effect to enhance hardness and strength may in contrast insufficiently be obtained. Accordingly, the average crystal grain size of first phase 1 is desirably 0.1 µm or more and 10 µm or less. Furthermore, in order to further increase an effect to increase hardness and strength while suppressing reduction in ductility, in the above range, being 0.5 µm or more and 8 µm or less is more desirable.

The average crystal grain size of second phase 2 and third phase 3 (and fourth phase 4 if any) can be similarly discussed although the phases are phases configuring a portion of the heat-resistant tungsten alloy. That is, these phases' average crystal grain size is also desirably 0.1 µm or more and 10 µm or less and more desirably 0.5 µm or more and 8 µm or less.

Note that as a method of measuring the crystal grain size, an interception method is mentioned. This is a method in which a cross section of a portion to be measured is photographed with a magnification of 1000 times, and on this photographic image a straight line is drawn arbitrarily, and the crystal grains traversed by this straight line have their grain sizes individually measured and summed together. The measurement is done in a field of view of approximately 120 µm×90 µm for example, and the number of crystal grains to be measured is 50 or more for example. Furthermore, the observed crystal grain's composition can be identified for example by a line analysis by EPMA (Electron Probe MicroAnalyser).

<Physical Property>

Subsequently, a physical property of the heat-resistant tungsten alloy for the friction stir welding tool according to the embodiment of the present invention will be described.

The heat-resistant tungsten alloy according to the embodiment of the present invention has strength such that the alloy has a Vickers hardness of 550 Hv or more at a room temperature, a fracturing flexure of 1 mm or more, as determined in a three point bending test at 1200° C., and a 0.2% proof stress of 900 MPa or more, as determined in the three point bending test at 1200° C.

The heat-resistant tungsten alloy having such a physical property can be applied to a heat-resistant member required to have a high melting point and large hardness, such as a friction stir welding member of Fe-, FeCr- and Ti-bases etc. for example.

Note that 0.2% proof stress (equivalent to bending) as referred to herein indicates the stress in a case where when a bending test is conducted the amount of permanent set is 0.2%, and hereafter it will be referred to as "0.2% proof stress (equivalent to bending)."

Note that while the present invention is a "heat-resistant" tungsten alloy, room temperature hardness is set as a condition for the following reason:

When using the heat-resistant tungsten alloy according to the embodiment of the present invention as a friction stir welding tool, the amount of the tool worn has a close relationship with the hardness of a material of the tool, and, larger hardness can have an effect to reduce the amount of the tool worn. In friction stir welding, when inserting the tool, a large load is caused to the tool, and accordingly, the wear at the time of the insertion appears remarkably. At the time of the insertion, the tool and the workpiece generate only small heat and both do not have high temperature, and accordingly, the tool will be warn in an amount depending on its hardness at room temperature. Although the heat-resistant tungsten alloy according to the embodiment of the present invention may be used as a friction stir welding tool itself, in many cases it is used as a matrix of the friction stir welding tool and has a surface coated with a coating containing at least one or more elements selected from the group consisting of group IVa, Va, VIa, IIIb elements and a group IVb element other than C in the periodic table, or a carbide, nitride, or carbonitride of at least one or more elements selected from that group and is thus presented as the tool. Herein, when it is actually used as a tool, initially the tool is strongly pressed into a workpiece at room temperature and in that condition it is rotated, and by frictional heat, increases the workpiece's temperature. Accordingly, it is necessary that the matrix's room temperature hardness is high (i.e., 550 Hv or more) so that in an initial stage of rotation the matrix does not deform or fracture or the matrix does not have the coating peeled off.

Furthermore, preferably the above heat-resistant tungsten alloy has a Vickers hardness of 190 Hv or more at 1000° C. 190 Hv or more can suppress wear more when the alloy is used as a friction stir welding tool and the tool is used continuously.

The above is a condition of the heat-resistant tungsten alloy.

<Production Method>

Hereinafter reference will be made to FIG. 2 to describe the heat-resistant tungsten alloy according to the embodiment of the present invention and a method of producing a friction stir welding tool using the same.

Figure 2:
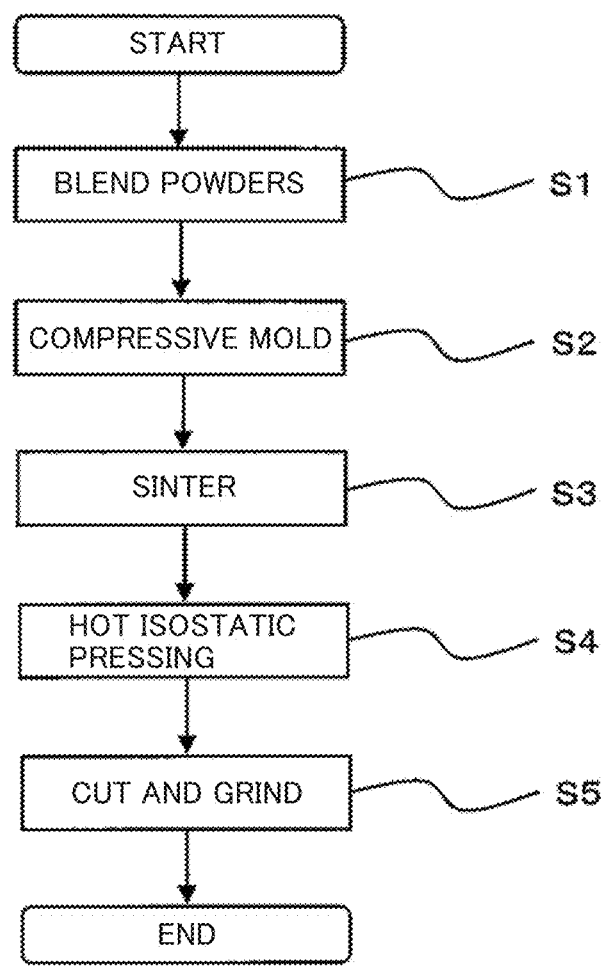
FIG. 2 is a flowchart indicating a method for producing a friction stir welding tool according to an embodiment of the present invention.

While the heat-resistant tungsten alloy according to the embodiment of the present invention and the method of producing a friction stir welding tool using the same are not particularly limited as long as they allow a friction stir welding tool satisfying the above-mentioned condition to be produced, a method as shown in FIG. 2 can be illustrated.

Initially, powdery source materials are mixed at a prescribed ratio to prepare a powdery mixture (see FIG. 2 at S1).

As the source materials, powdery W and powdery TiCN (or powdery carbonitride of such as titanium carbonitride, zirconium carbonitride, and hafnium carbonitride), and a powdery group 5A carbide are mentioned, and hereinafter each powdery material's condition will be simply described.

Preferably the powdery W has a purity of 99.99 mass % or more and an Fsss (Fisher Sub-Sieve Sizer) average particle diameter of 0.1 μm to 5.0 μm.

Note that the powdery W's purity as referred to herein is obtained by a method of analyzing a tungsten material as specified in JIS H 1403, and means a pure metal content excluding the values of Al, Ca, Cr, Cu, Fe, Mg, Mn, Ni, Pb, Si and Sn.

Preferably the powdery carbonitride has a purity of 99.9% or more and an Fsss average particle diameter of 2 μm to 3 μm.

The powdery carbide also preferably has a purity of 99.9% or more and an Fsss average particle diameter of 2 μm to 3 μm.

Note that the powdery carbonitride's purity means a pure content excluding the values of Al, Ca, Cr, Cu, Fe, Mg, Mn, Ni, Si and Sn.

Furthermore, the powdery materials may be mixed together using any device or method, and a known mixer, such as a mortar, a V type mixer, and a ball mill, can be used.

Subsequently, the obtained powdery mixture is compression-molded to produce a compact (see FIG. 2 at S2).

The compression molding may be done in any apparatus, and any press such as a uniaxial press, CIP (Cold Isostatic Pressing) or the like may be used. As a condition for the compression, the compression may be done at a room temperature (of 20° C.).

The compaction pressure, for CIP, is preferably 98-294 MPa (at room temperature). This is because a compaction pressure less than 98 MPa results in a compact failing to have sufficient density, whereas a compaction pressure exceeding 294 MPa entails compression equipment increased in size and a die increased in size, which is disadvantageous in terms of cost.

Subsequently, the obtained compact is heated and thus sintered (see FIG. 2 at S3).

Specifically, pressureless sintering at a sintering temperature of 1800° C. or more and 2000° C. or less is desirable.

This is because when the heating temperature is 1800° C. or less, insufficient sintering is done and the resultant sintered compact has a low density, whereas when the heating temperature is 2000° C. or more, the carbonitride's decomposition proceeds, which leads to growth of a huge columnar crystal grain and as a result the heat-resistant tungsten alloy is reduced in strength. Accordingly, the sintering is preferably done at 1800° C. or more and 2000° C. or less. Furthermore, a more preferable sintering temperature is 1900° C. or more 2000° C. or less in view of further increasing high temperature strength.

Then, when the obtained sintered compact has a relative density of approximately 95%, then it is preferable to perform hot isostatic pressing (hereinafter also referred to as HIP) in an inert atmosphere (see FIG. 2 at S4). Note that when the obtained sintered compact has a relative density of 96% or more, then even with HIP omitted, room temperature hardness, and 0.2% proof stress at high temperature are hardly reduced.

As a specific pressurizing condition when HIP is performed, it is preferable that the HIP process be performed in an inert atmosphere having a temperature of 1400-1800° C. and a pressure of 152.0-253.3 MPa. This is because below this range the density is not increased whereas above the range, large-sized equipment will be required, which affects the production cost.

The thus obtained source material for a friction stir welding tool is cut, ground, polished, coated and the like (see FIG. 2 at S5), and the friction stir welding tool is thus produced.

The heat-resistant tungsten alloy according to the embodiment of the present invention and the method of producing a friction stir welding tool using the same are thus described.

<Friction Stir Welding Tool>

While the heat-resistant tungsten alloy which forms the friction stir welding tool according to the embodiment of the present invention has the above configuration, hereinafter a configuration of the friction stir welding tool using the heat-resistant tungsten alloy according to the embodiment of the present invention will briefly be described with reference to FIG. 3.

Figure 3:
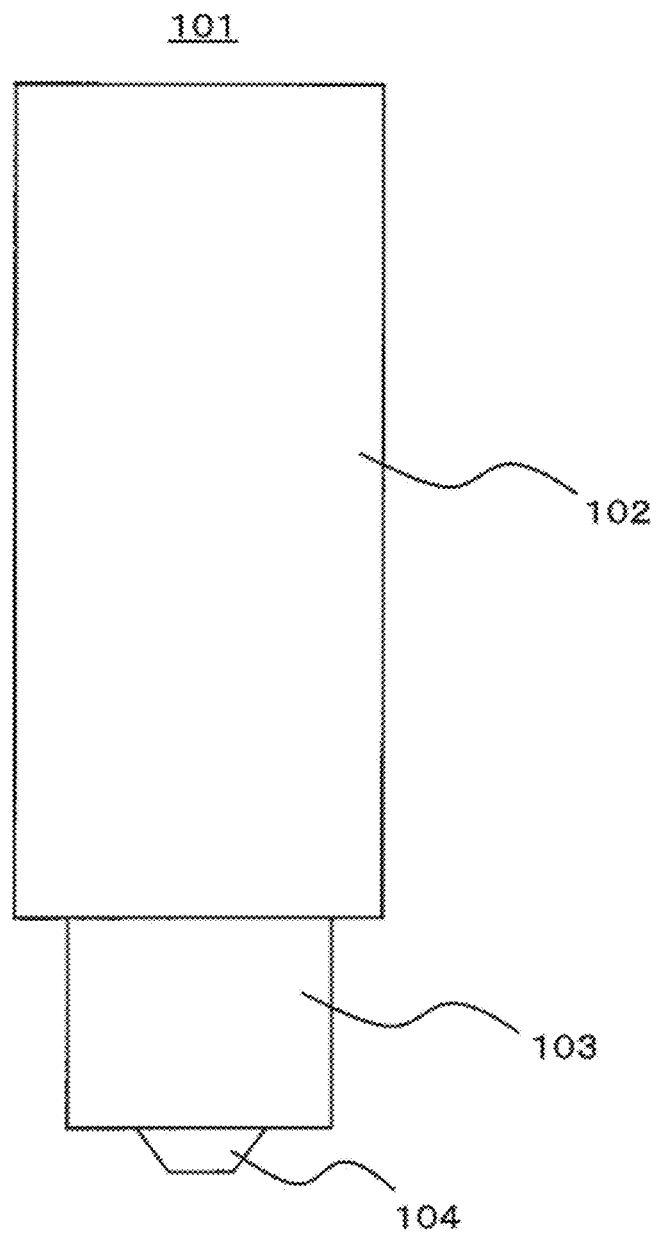
FIG. 3 is a side view showing a friction stir welding tool according to an embodiment of the present invention.

FIG. 3 is a side view showing a friction stir welding tool 101 according to an embodiment of the present invention.

As shown in FIG. 3, friction stir welding tool 101 has a shank 102 coupled with a spindle (not shown) of a welding apparatus, a shoulder 103 in contact with a surface of a workpiece when it is welded, and a pin 104 inserted into the workpiece when it is welded.

Among these, at least a matrix of shoulder 103 and pin 104 is formed of the heat-resistant tungsten alloy according to the present invention.

Furthermore, to prevent the friction stir welding tool in use from being oxidized or welded to the workpiece due to the temperature in use, it is preferable that the heat-resistant tungsten alloy have a surface coated with a coating containing at least one or more elements selected from the group consisting of group IVa, Va, VIa, IIIb elements and a group IVb element other than C in the periodic table, or a carbide, nitride, or carbonitride of at least one or more elements selected from that group. The coating layer preferably has a thickness of 1-20 μm. When the thickness of the coating layer is less than 1 μm, an effect by having provided the coating layer cannot be expected. On the other hand, when the thickness of the coating layer is 20 μm or more, an excessive stress is caused and the coating may be peeled off, resulting in an extremely poor yield.

Such a coating (a coating layer) includes a coating containing TiC, TiN, TiCN, ZrC, ZrN, ZrCN, VC, VN, VCN, CrC, CrN, CrCN, TiAlN, TiSiN or TiCrN, and a coating having a multilayer including at least two layers or more thereof. Note that the coating layer can have each element at a composition ratio set as desired. The above TiCN is also not limited to a value x of $TiC_xN_{1-x}$ (x=0.3-0.7) indicated in the present invention.

The method of forming the coating layer is not limited in particular, and it can be a known method. While as representative methods, PVD (Physical Vapor Deposition) such as arc ion plating, sputtering, etc., CVD (Chemical Vapor Deposition) utilizing a chemical reaction to provide coating, plasma CVD which decomposes a gaseous element by plasma and ionizes it to provide coating, and the like are mentioned, any of these methods allows a monolayer and a multilayer to be both processed, and when the heat-resistant tungsten alloy of the present invention is used as a matrix, excellent adhesion can be exhibited.

Thus the heat-resistant tungsten alloy according to an embodiment of the present invention has first phase 1 containing W as a major component, second phase 2 having a carbonitride of at least one element of Ti, Zr and Hf and containing the carbonitride as a major component when W is removed, and third phase 3 having a carbide of at least one element of group 5A elements in the periodic table and containing the carbide as a major component when W is removed, the heat-resistant tungsten alloy having a Vickers hardness of 550 Hv or more at a room temperature, a fracturing flexure of 1 mm or more, as determined in a three point bending test at 1200° C., and a 0.2% proof stress of 900 MPa or more, as determined in the three point bending test at 1200° C.

Accordingly, the friction stir welding tool using the heat-resistant tungsten alloy according to the embodiment of the present invention satisfies both a physical property such as proof stress and hardness accommodating a workpiece to be welded (or worked) having a high melting point and practicability more than conventional.

EXAMPLES

Hereafter, the present invention will more specifically be described based on examples.

Example 1

Initially, W was blended with a carbonitride of 10 volume % of TiCN and a group 5A carbide of 2.5 volume % of NbC to produce an alloy, which was then subjected to hardness measurement and a bending test. Specifically, this is done in the following procedure:

<Producing Sample>

Initially, powdery W, powdery TiCN, and powdery NbC were prepared as source materials. Specifically, the powdery W was a powdery W produced by A.L.M.T. Corp and having a purity equal to or greater than 99.99 mass % and an average particle diameter, as measured in the Fsss method, of 1.2 μm.

Furthermore, the powdery TiCN was a powdery TiCN produced by A.L.M.T. Corp and having a product type name of 5OR08, and a purity equal to or greater than 99.9 mass % and an average particle diameter, as measured in the Fsss method, of 0.8 μm.

Furthermore, the powdery NbC was Wako 1st Grade powdery NbC produced by Wako Pure Chemical Industries, Ltd. and having an average particle diameter of 1 μm to 3 μm.

Subsequently, these powdery materials were mixed together in a mortar to prepare a powdery mixture, and a uniaxial press was used to compress the mixture at a temperature of 20° C. with a compaction pressure of 294 MPa applied to obtain a compact.

Subsequently, the obtained compact was heated in a pressureless hydrogen atmosphere at a temperature of 2000° C. to obtain a sintered compact having a relative density of 95% or more.

Furthermore, the sintered compact was subjected to an HIP process at a processing temperature of 1600° C. in an Ar atmosphere with a pressure of 202.7 MPa applied to produce a heat-resistant tungsten alloy having a relative density of approximately 99%.

Subsequently, the produced heat-resistant tungsten alloy had its structure subjected to an observation via an electron microscope and a composition analysis via EPMA. The measurement was done under the following conditions:

Conditions for line analysis by EPMA

Equipment: EPMA1720H (made by Shimadzu Corporation)

Acceleration voltage: 15 kV

Beam current: 20 nA

Beam size: 1 μm

Measurement magnification: 5000 times

Reset time: 20 s/point

Figure 4:
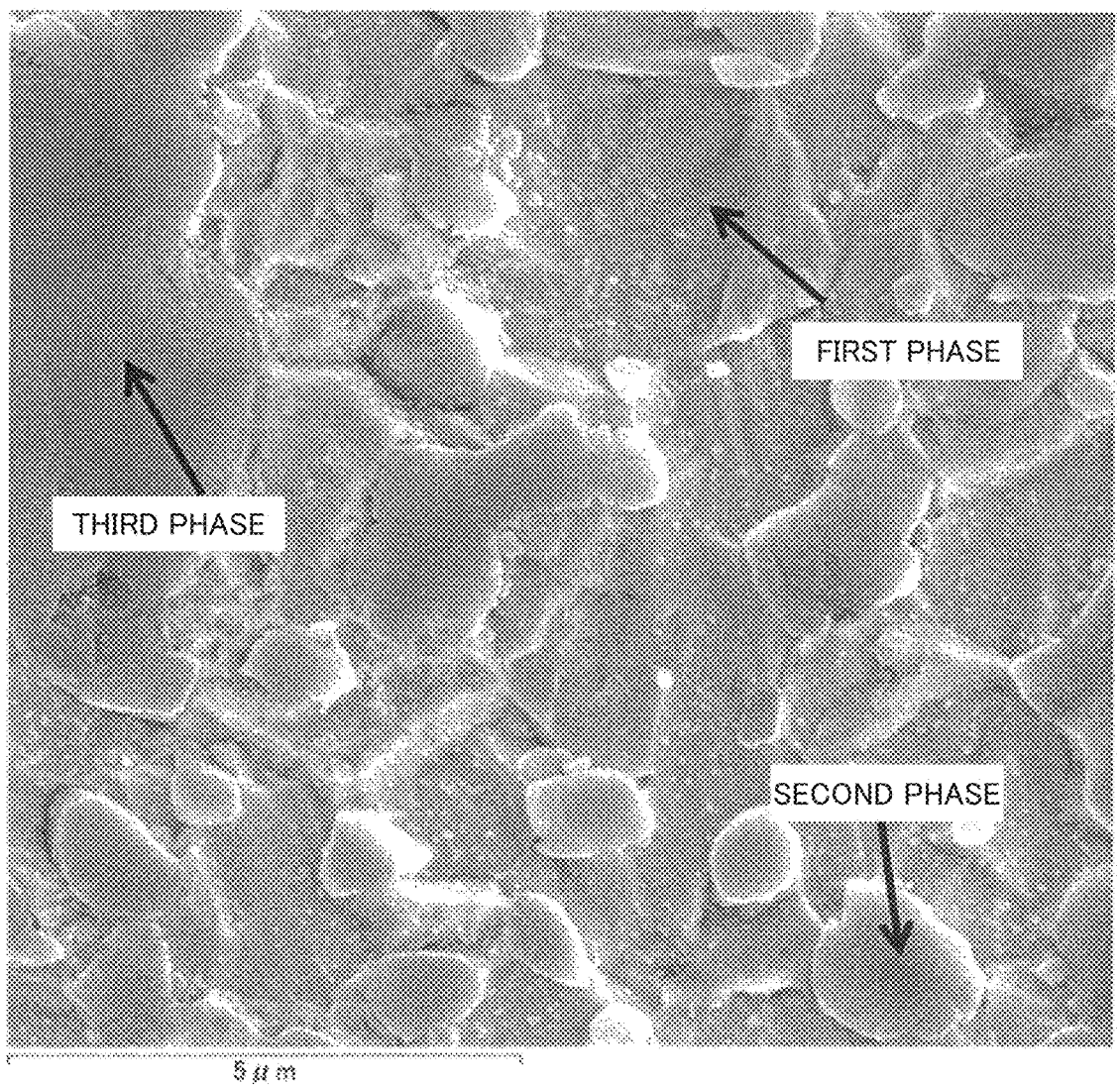
FIG. 4 is a schematic of an enlarged photograph of a cross section of a heat-resistant tungsten alloy according to an example of the present invention.

FIG. 4 shows a schematic of a photograph obtained via the electron microscope.

Furthermore, the observed structure's composition is shown in table 1. Note that a composition as referred to herein indicates a ratio of W, Ti, Nb, C and N in each structure. Note that, furthermore, a second phase as referred to herein indicates a phase in which TiCN serves as a major component if W is excluded, and a third phase as referred to herein indicates a phase in which NbC serves as a major component if W is excluded. The second phase having TiCN as a major component and the third phase having NbC as a major component have been confirmed in a method in which an x-ray diffractometer was used to confirm that diffraction peaks of TiCN and NbC were obtained, and thus a compound component was identified.

The measurement was done under the following conditions:

Equipment: X-ray diffractometer produced by PANalytical (Empyrean)

Tubular bulb: Cu (Kα x-ray diffraction)

Solar slit: 0.04 rad

Aperture angle of divergent slit: 1/2°

Aperture angle of scattering slit 1°

Tube current: 40 mA

Tube voltage: 45 kV

Scanning speed: 0.33°/min

Figure 5:
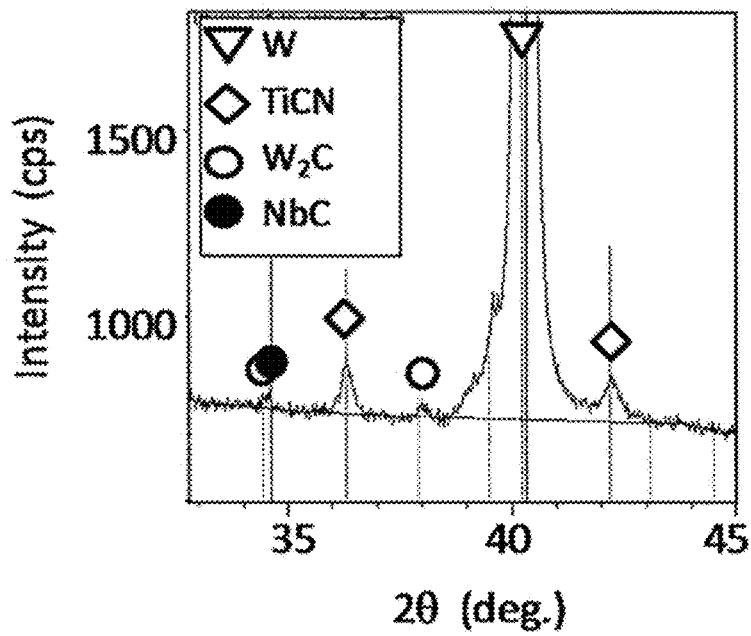
FIG. 5 is an example of a diffraction peak obtained by subjecting a sample of Example 1 to measurement by x-ray diffraction.

FIG. 5 shows an example of a diffraction peak obtained via x-ray diffraction. From this result, it has been found that the second phase's major component is TiCN and the third phase's major component is NbC.

TABLE 1

| mass % | W | Ti | Nb | C | N |
| --- | --- | --- | --- | --- | --- |
| first phase | 85-95 | 0-1 | 0-1 | 1-10 | 0-5 |
| second phase | 30-90 | 10-50 | 0-15 | 1-20 | 0-20 |
| third phase | 30-90 | 0-30 | 10-40 | 1-20 | 0-10 |

In the produced heat-resistant tungsten alloy, first phase 1 containing W as a major component, second phase 2 having a carbonitride of Ti and containing the carbonitride of Ti as a major component when W is removed, and third phase 3 having a carbide of Nb and containing the carbide of Nb as a major component when W is removed, had been formed.

<Hardness Measurement>

Subsequently, the obtained heat-resistant tungsten alloy was subjected to hardness measurement.

Specifically a Micro Vickers hardness meter produced by AKASHI Corp. (type number: AVK) was used, with a measuring indenter of diamond, and a measuring load of 20 kg was applied to a sample in the atmospheric air at 20° C. and 1200° C. for 15 seconds to thus measure Vickers hardness. The measurement was done at 5 points and an average value was calculated therefrom. The result is as follows:

Room temperature hardness: 580 Hv

Vickers hardness at 1000° C.: 220 Hv

<High Temperature Strength Measurement>

Subsequently, the obtained alloy's high temperature strength was evaluated.

A friction stir welding tool performs welding as it is transversely moved while rotating, and accordingly, it requires strength against rotary bending at high temperature, however, a high temperature, rotary bending test is a special test. Accordingly, herein, a simple bending test was conducted to evaluate high temperature strength. Furthermore, the friction stir welding tool is required to have deformation resistance, and accordingly, for the purpose of performing an evaluation for a single amount of strain, a stress when a 0.2% of strain was caused for the sake of convenience, i.e., a 0.2% proof stress (equivalent to bending) was used. (In general, the 0.2% proof stress is used to assess a material which does not present a clear yield point in a tensile test).

The 0.2% proof stress (equivalent to bending) was measured in the following procedure:

Initially, a sample piece of the heat-resistant tungsten alloy was processed to have a length of approximately 25 mm, a width of 2.5 mm and a thickness of 1.0 mm, and had a surface abraded with a SiC abrasive paper of #600.

Figure 6:
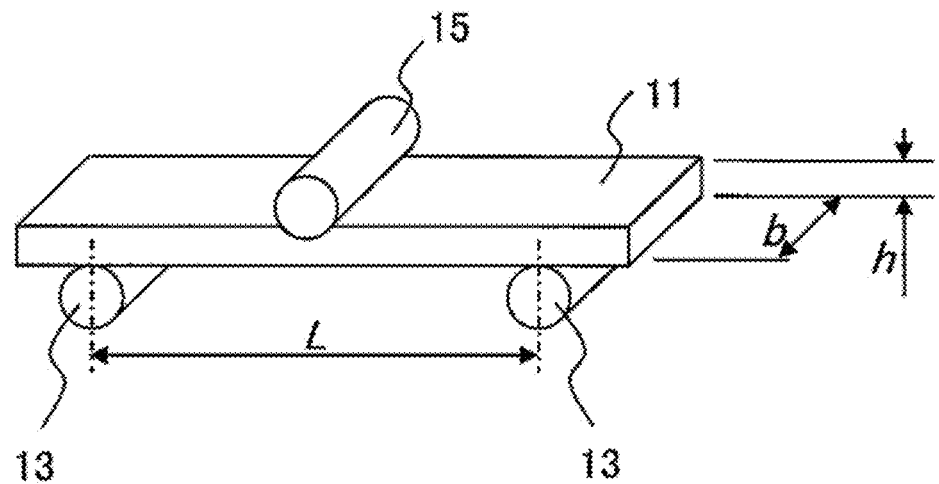
FIG. 6 is a schematic diagram schematically showing a three point bending test.
Figure 7:
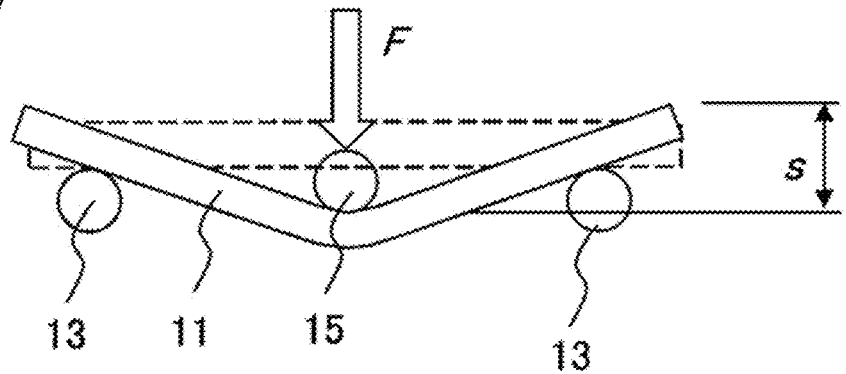
FIG. 7 is a schematic diagram schematically showing the three point bending test.

Subsequently, as shown in the schematic diagrams shown in FIG. 6 and FIG. 7, Sample piece 11 was set in a high temperature universal tester produced by INSTRON (type number: 5867 type) such that pins 13 were spaced by 16 mm, and a head 15 was pressed against the sample in an Ar atmosphere at 1200° C. at a crosshead speed of 1 mm/min to conduct a three point bending test to measure the 0.2% proof stress (equivalent to bending). The 0.2% proof stress (equivalent to bending) was obtained as follows: Bending stress and strain in the three point bending test were calculated using the following expression and a stress-strain diagram was accordingly drawn to analyze a stress for which a permanent strain of 0.2% was caused.

Bending stress=3 FL/2bh$^2$

Bending strain=600 sh/L$^2$

Note: F: testing load (N); L: distance between supporting points (mm); b: width of test piece (mm); h: thickness of test piece (mm); and s: amount of flexure (mm).

Furthermore, since by the above measurement a relationship between the load and the amount of flexure was obtained, the amount of flexure when the sample piece fractured was read to evaluate toughness. Note that the limit of the amount of flexure for the equipment was at most 6 mm, and accordingly, when 6 mm was reached the measurement was interrupted and it was assessed as full bend.

Note that fracture before the 0.2% proof stress is obtained in the bending test (fracturing flexure: 0.4 mm or less) is defined as brittle fracture.

The result is as follows:

0.2% proof stress in the three point bending test at 1200° C.: 1150 MPa

Fracturing flexure in the three-point-bending test at 1200° C.: 6 mm or more (the equipment's limit: 6 mm)

From this result, it has been found that a heat-resistant tungsten alloy has been obtained which has a Vickers hardness of 550 Hv or more at a room temperature, and a Vickers hardness of 190 Hv or more at a temperature of 1000° C., a fracturing flexure of 1 mm or more, as determined in a three point bending test at 1200° C., and a 0.2% proof stress of 900 MPa or more, which have conventionally been considered to be difficult to obtain.

Comparative Example 1

A heat-resistant tungsten alloy was produced and tested such that it had a composition of W—10.5 volume % of TiCN—1.5 volume % of HfC and the other conditions were the same as Example 1. That is, a carbide of a group 5A element was not added and a carbide of a group 4A element (Hf) was instead added to produce a heat-resistant tungsten alloy which was in turn tested. The powdery HfC was a powdery HfC produced by Kojundo Chemical Laboratory Co., Ltd., and having an average particle diameter of 0.9 µm in the Fsss method.

Figure 8:
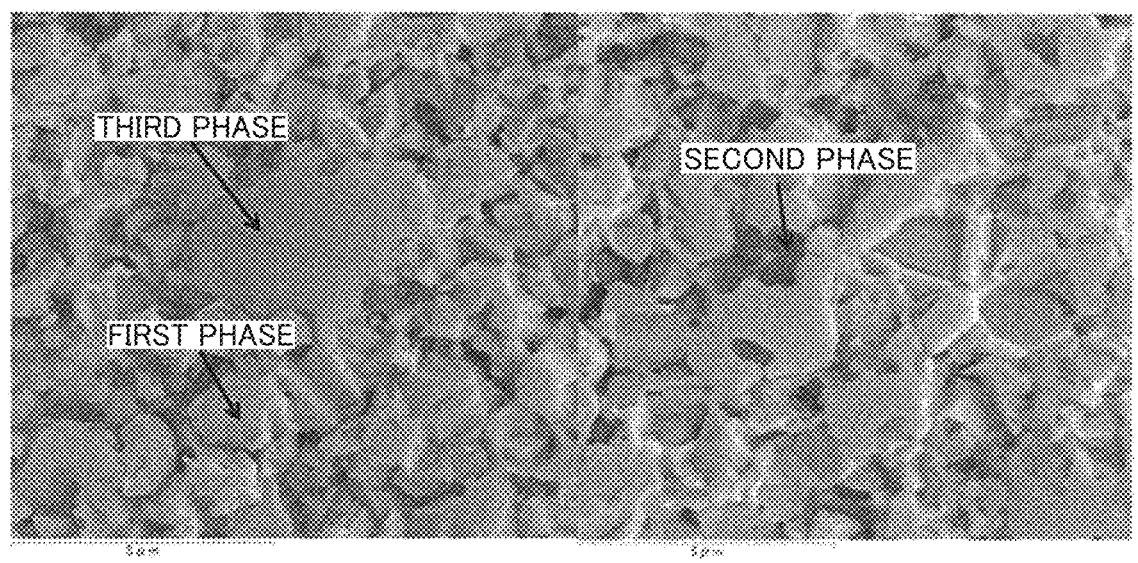
FIG. 8 is a schematic of an enlarged photograph of a cross section of a heat-resistant tungsten alloy according to a comparative example of the present invention.

FIG. 8 shows a schematic of a photograph obtained via an electron microscope.

Furthermore, the observed structure's composition is shown in table 2. Note that a composition as referred to herein indicates a ratio of W, Ti, Hf, C and N in each structure. Note that, furthermore, a second phase as referred to herein indicates a phase in which TiCN serves as a major component if W is excluded, and a third phase as referred to herein indicates a phase in which HfC serves as a major component if W is excluded.

TABLE 2

| mass % | W | Ti | Hf | C | N |
|---|---|---|---|---|---|
| first phase | 70-98 | 0.5-10 | 0.5-10 | 1-10 | 0-5 |
| second phase | 30-90 | 10-40 | 4 | 10 | 0-15 |
| third phase | 0-5 | 0.5 | 10-85 | 1-10 | 0-5 |

As shown in FIG. 8, it has been found that the sample maintained a powdery form and sintering did not proceed. It is believed that this is because by adding Ti and Hf that are elements of the same group of the group 4A in the forms of a carbonitride and a carbide, respectively, diffusion of nitrogen in TiCN and mutual diffusion of the group 4A elements were inhibited and progress of sintering was inhibited.

Example 2

A heat-resistant tungsten alloy was produced and tested such that it was produced with a variety of compositions and the other conditions were the same as Example 1. The result is shown in table 3.

Note that each phase's average particle diameter was controlled in the following method: for the first phase, powdery W produced by A.L.M.T. Corp (product type name: A20, B20, C20, D10, D20 etc.) was used, for the second phase, powdery TiCN produced by A.L.M.T. Corp (product type name: 5OR08, 5MP15, 5MP30) was used, and furthermore, the powdery ZrCN was a powdery ZrCN produced by A.L.M.T. Corp and having a product type name of 5OV25, and an average particle diameter, as measured in the Fsss method, of 2.0 µm to 3.0 µm. Furthermore, the powdery HfCN was powder produced by way of trial by the Applicant and having an average particle diameter of 2.0 µm to 3.0 µm.

For the third phase were used powdery VC (product type name: OR10), powdery NbC produced by Japan New Material Co., Ltd., powdery TaC, or the above powdery material that was crushed and classified, and thus adjusted, and the powder was sintered for an adjusted period of time to control progress of grain growth.

Furthermore, of the heat-resistant tungsten alloys shown in table 3, in all of the heat-resistant tungsten alloys excluding sample numbers 1 and 15, first phase 1 containing W as a major component, second phase 2 having a carbonitride of at least one element of Ti, Zr and Hf and containing the carbonitride as a major component when W is removed, and third phase 3 having a carbide of at least one element of group 5A elements in the periodic table and containing the carbide as a major component when W is removed had been formed.

TABLE 3

| sample No. | amount added (vol %) | | | | | | crystal grain size (µm) | | | sintering temperature (° C.) | hardness (Hv) | | bending strength at 1200° C. (MPa) | | fracturing flexure (mm) |
|---|---|---|---|---|---|---|---|---|---|---|---|---|---|---|---|
| | TiCN | ZrCN | HfCN | Vc | NbC | TaC | 1st phase | 2nd phase | 3rd phase | | room temperature | 1000° C. | 0.2% proof stress | bending strength | |
| 1 | 10 | 0 | 0 | 0 | 0 | 0 | 1.5 | 1.0 | — | 2000 | 556 | 198 | 583 | full bend | ≥6 |
| 2 | 1 | | | 2.5 | | | | | 0.8 | | 480 | 186 | 854 | | |
| 3 | 2 | | | | | | | | | | 550 | 195 | 948 | | |
| 4 | 0 | 2 | | | | | | | | | 556 | 198 | 955 | | |
| 5 | 0 | 0 | 2 | | | | | | | | 551 | 196 | 952 | | |
| 6 | 5 | | 0 | | | | | | | | 565 | 204 | 1035 | | |
| 7 | 10 | | | | | | | | | | 580 | 220 | 1150 | | |
| 8 | 0 | 10 | | | | | | | | | 577 | 218 | 1108 | | |
| 9 | 0 | 0 | 10 | | | | | | | | 589 | 222 | 1134 | | |
| 10 | 20 | | 0 | | | | | | | | 645 | 249 | 1198 | | |
| 11 | 25 | | | | | | | | | | 660 | 260 | 1230 | 1382 | 4.5 |
| 12 | 0 | 25 | | | | | | | | | 668 | 269 | 1241 | 1366 | 3.9 |
| 13 | 0 | 0 | 25 | | | | | | | | 665 | 265 | 1234 | 1373 | 4.1 |
| 14 | 30 | | 0 | | | | | | | | 685 | 278 | brittle | 1150 | 0.3 |
| 15 | 33.4 | | | | 0 | | | | — | | 492 | 280 | fracture | 1232 | 0.3 |
| 16 | 10 | 0 | 0 | 0.3 | 0 | 0 | 1.5 | 1.0 | 0.8 | 2000 | 541 | 167 | 798 | full bend | ≥6 |
| 17 | | | | 0.9 | | | | | | | 562 | 185 | 964 | | |
| 18 | | | | 1 | | | | | | | 570 | 200 | 1029 | | |
| 19 | | | | 1.5 | | | | | | | 575 | 201 | 1035 | | |
| 20 | | | | 3 | | | | | | | 591 | 211 | 1097 | | |
| 21 | | | | 9 | | | | | | | 633 | 224 | 1182 | | |
| 22 | | | | 14 | | | | | | | 676 | 231 | 1220 | 1276 | 1.1 |
| 23 | | | | 16 | | | | | | | 691 | 235 | brittle fracture | 914 | 0.2 |

TABLE 3-continued

| sample No. | TiCN | ZrCN | HfCN | VC | NbC | TaC | crystal grain size (μm) 1st phase | 2nd phase | 3rd phase | sintering temperature (°C) | hardness (Hv) room temperature | 1000° C. | bending strength at 1200° C. (MPa) 0.2% proof stress | bending strength | fracturing flexure (mm) |
|---|---|---|---|---|---|---|---|---|---|---|---|---|---|---|---|
| 24 | | | | 0 | 0.2 | 0 | | | | | 537 | 180 | 833 | full | ≥6 |
| 25 | | | | | 0.5 | | | | | | 552 | 198 | 951 | bend | |
| 26 | | | | | 1.2 | | | | | | 569 | 206 | 1022 | | |
| 27 | | | | | 11 | | | | | | 628 | 249 | 1315 | | |
| 28 | | | | | 15 | | | | | | 652 | 259 | 1398 | 1482 | 1.5 |
| 29 | | | | | 17 | | | | | | 655 | 261 | brittle fracture | 1331 | 0.3 |
| 30 | | | | 0 | 0 | 0.4 | | | 2.5 | | 528 | 198 | 887 | full | ≥6 |
| 31 | | | | | | 0.6 | | | | | 550 | 205 | 951 | bend | |
| 32 | | | | | | 1.2 | | | | | 566 | 212 | 1092 | | |
| 33 | | | | | | 13 | | | | | 610 | 266 | 1398 | | |
| 34 | | | | | | 15 | | | | | 620 | 273 | 1445 | 1473 | 1.5 |
| 35 | | | | | | 19 | | | | | 626 | 275 | brittle fracture | 1380 | 0.2 |
| 36 | 10 | 0 | 0 | 0 | 2.5 | 0 | 0.1 | 1.0 | 0.8 | 2000 | 590 | 230 | 1182 | 1326 | 4.6 |
| 37 | | | | | | | 0.5 | | | | 586 | 221 | 1159 | full | ≥6 |
| 38 | | | | | | | 8 | | | | 564 | 204 | 1022 | bend | |
| 39 | | | | | | | 10 | | | | 562 | 202 | 961 | | |
| 40 | | | | | | | 12 | | | | 524 | 185 | 784 | | |
| 41 | 10 | 0 | 0 | 0 | 2.5 | 0 | 1.5 | 0.1 | 0.8 | 2000 | 586 | 224 | 1161 | 1252 | 3.9 |
| 42 | | | | | | | | 0.5 | | | 583 | 222 | 1142 | full | ≥6 |
| 43 | | | | | | | | 8 | | | 568 | 204 | 1002 | bend | |
| 44 | | | | | | | | 10 | | | 556 | 201 | 952 | | |
| 45 | | | | | | | | 11 | | | 518 | 170 | 752 | | |
| 46 | 10 | 0 | 0 | 3 | 0 | 0 | 1.5 | 1.0 | 0.1 | 2000 | 595 | 215 | 1103 | 1205 | 2.5 |
| 47 | | | | | | | | | 0.5 | | 592 | 213 | 1085 | full | ≥6 |
| 48 | | | | | | | | | 8 | | 571 | 208 | 1011 | bend | |
| 49 | | | | | | | | | 10 | | 560 | 203 | 958 | | |
| 50 | | | | | | | | | 11 | | 523 | 166 | 755 | | |
| 51 | | | | 0 | 2.5 | | | | 0.1 | | 586 | 225 | 1173 | 1269 | 3.1 |
| 52 | | | | | | | | | 0.5 | | 582 | 221 | 1164 | full | ≥6 |
| 53 | | | | | | | | | 8 | | 572 | 211 | 1035 | bend | |
| 54 | | | | | | | | | 10 | | 558 | 205 | 965 | | |
| 55 | | | | | | | | | 11 | | 520 | 172 | 762 | | |
| 56 | | | | | 0 | 1.2 | | | 0.1 | | 581 | 228 | 1180 | 1275 | 3.4 |
| 57 | | | | | | | | | 0.5 | | 577 | 224 | 1165 | full | ≥6 |
| 58 | | | | | | | | | 0.8 | | 573 | 220 | 1149 | bend | |
| 59 | | | | | | | | | 8 | | 565 | 209 | 1028 | | |
| 60 | | | | | | | | | 10 | | 552 | 205 | 957 | | |
| 61 | | | | | | | | | 12 | | 515 | 182 | 783 | | |
| 62 | 10 | 0 | 0 | 0 | 2.5 | 0 | 1.5 | 1.0 | 0.8 | 1700 | 520 | 175 | 768 | full | ≥6 |
| 63 | | | | | | | | | | 1800 | 560 | 201 | 950 | bend | |
| 64 | | | | | | | | | | 1900 | 572 | 209 | 1032 | | |

From the table the following has been found.

Initially, the carbonitrides of group 4A Ti, Zr and Hf can be added to allow the resultant heat-resistant tungsten alloys to have substantially equivalent physical properties. Furthermore, it has been found that, from the viewpoint of enhancing the heat-resistant tungsten alloy in room temperature hardness, high temperature strength and ductility, and furthermore, from the viewpoint of enhancing it in high temperature strength, the above group 4A carbonitride's volume % is desirably equal to or greater than 5 volume % and equal to or less than 25 volume %, and more desirably equal to or greater than 5 volume % and equal to or less than 20 volume %.

It has been found that, from the viewpoint of enhancing the heat-resistant tungsten alloy in room temperature hardness, high temperature strength and ductility, and furthermore, from the viewpoint of enhancing it in high temperature strength, the volume % of the carbide of any of group 5A's V, Nb and Ta is desirably equal to or greater than 0.5 volume % and equal to or less than 15 volume %, and more desirably equal to or greater than 1 volume % and equal to or less than 13 volume %.

It has been found that, from the viewpoint of enhancing the heat-resistant tungsten alloy in room temperature hardness, high temperature strength and ductility, and furthermore, from the viewpoint of enhancing it in high temperature strength, each phase's crystal desirably has an average grain size of 0.1 μm or more and 10 μm or less, more desirably 0.5 μm or more and 8 μm or less.

(Reference Example)

Although the above examples and comparative examples have their compositions represented in volume %, they can also be represented in mass %. The following examples have their compositions represented in mass %.

(Reference Example 1)

Initially, in order to investigate a relationship between a content of a carbonitride in an alloy and a physical property of the alloy, as a preliminary test, the carbonitride was alone added to W to produce a heat-resistant tungsten alloy which was in turn subjected to measurement of room temperature hardness, and a bending test at high temperature. Specifically, this is done in the following procedure:

<Producing Sample>

Initially, powdery W for a matrix (or first phase 1), and powdery TiCN, powdery ZrCN and powdery HfCN for carbonitrides were prepared as source materials. Specifically, the powdery W was a powdery W produced by A.L.M.T. Corp and having a purity equal to or greater than 99.99 mass % and an average particle diameter, as measured in the Fsss method, of 1.2 µm.

Furthermore, the powdery TiCN was a powdery TiCN produced by A.L.M.T. Corp and having a product type name of 5OR08, and a purity equal to or greater than 99.9 mass % and an average particle diameter, as measured in the Fsss method, of 0.8 µm.

Furthermore, the powdery ZrCN was a powdery ZrCN produced by A.L.M.T. Corp and having a product type name of 5OV25, and an average particle diameter, as measured in the Fsss method, of 2.0 µm to 3.0 µm.

Furthermore, the powdery HfCN was powder produced by way of trial by the Applicant and having an average particle diameter of 2.0-3.0 µm in the Fsss method.

Paraffin was used as a binder to promote compactibility, and any of powdery TiCN, powdery ZrCN and powdery HfCN was added to powdery W at a ratio shown in table 4.

Subsequently, these powdery materials were mixed together in a mortar to prepare a powdery mixture, and a uniaxial press was used to compress the mixture at a temperature of 20° C. with a compaction pressure of 3 ton/cm$^3$ applied to obtain a compact.

Subsequently, the obtained compact was heated in a hydrogen atmosphere (under the atmospheric pressure) at a temperature of 1900° C. to obtain a sintered compact having a relative density of 90% or more.

Furthermore, the sintered compact was subjected to an HIP process at a processing temperature of 1600° C. in an Ar atmosphere with a pressure of 202.7 MPa applied to produce a heat-resistant tungsten alloy having a relative density of approximately 98%.

Note that this was done such that the content of each element in the produced sample was similar to that of Example.

<Hardness Measurement>

Subsequently, the obtained heat-resistant tungsten alloy was subjected to hardness measurement under a condition similar to that of Example.

The result is shown in table 4.

TABLE 4

| carbonitride's elemental content (mass %) | | amount as converted into carbonitride (mass %) | room temperature hardness (Hv) W alloy |
|---|---|---|---|
| Ti | 0.61 | 0.94 | 432.4 |
|    | 1.02 | 1.57 | 510.6 |
|    | 2.14 | 3.30 | 572.8 |
| Zr | 2.39 | 3.07 | 554.3 |
| Hf | 6.77 | 7.76 | 565.9 |
| Ti | 4.62 | 7.13 | 695.7 |
|    | 7.57 | 11.68 | 791.6 |
|    | 11.21 | 17.30 | 881.4 |
|    | 15.58 | 24.05 | 975.6 |
|    | 21.15 | 32.64 | 1101.8 |
|    | 22.41 | 34.59 | 1183.6 |

As is apparent from Table 4, as the content of the carbonitride in the alloy increased, the content of a metallic element which is one of the constituent elements of the carbonitride increased, and the alloy's room temperature hardness was increased.

In contrast, when the content of the metallic element which is one of the constituent elements of the carbonitride is less than 1 mass %, the alloy's hardness is approximately the same level as that of pure tungsten (i.e., about 400 Hv), and it has been found that the carbonitride added does not exhibit a sufficient effect.

<High Temperature Strength Measurement>

Subsequently, 0.2% proof stress (equivalent to bending), bending strength, and amount of flexure were measured in a procedure similar to that of Example.

The result is shown in table 5.

TABLE 5

| carbonitride's elemental content (mass %) | | amount as converted into carbonitride (mass %) | high temperature strength | | |
|---|---|---|---|---|---|
| | | | 0.2% proof stress (MPa) | bending strength (MPa) | amount of flexure at fracture (mm) |
| Ti | 0.61 | 0.94 | 479.7 | full bend | |
|    | 1.02 | 1.57 | 532.2 | | |
|    | 2.14 | 3.30 | 583.4 | | |
| Zr | 2.39 | 3.07 | 562.4 | | |
| Hf | 6.77 | 7.76 | 575.8 | | |
| Ti | 4.62 | 7.13 | 633 | | |
|    | 7.57 | 11.68 | brittle fracture | 1232 | 0.25 |
|    | 11.21 | 17.30 | fracture | 1163 | 0.19 |
|    | 15.58 | 24.05 | | 936.1 | 0.15 |
|    | 21.15 | 32.64 | | 784.2 | 0.12 |
|    | 22.41 | 34.59 | | 625.3 | 0.1 |

As is apparent from Table 5, containing Ti exceeding 7.6 mass % in W causes brittle fracture, and it has thus been found that the upper limit of the content of Ti in the alloy is more desirably equal to or less than 7.6 mass %.

Note that sintered compacts obtained through these tests contained carbonitride having an average gain size of 0.7 µm and tungsten having an average gain size of 0.8 µm. Note that carbonitrides of ZrCN and HfCN also allow room temperature hardness and high temperature strength equivalent to those of TiCN to be obtained.

(Reference Example 2)

Subsequently, in addition to the carbonitride the group 5A carbide was added to produce a heat-resistant tungsten alloy, and the alloy's structural observation and each phase's structure and physical property measurement were conducted. Specifically, this is done in the following procedure:

Initially, powdery W for first phase 1, powdery TiCN, powdery ZrCN and powdery HfCN for carbonitrides of second phase 2, and powdery NbC, powdery TaC and powdery VC for carbides of third phase 3 were prepared as source materials.

Specifically, the powdery W was a powdery W produced by A.L.M.T. Corp and having a purity equal to or greater than 99.99 mass % and an average particle diameter, as measured in the Fsss method, of 1.2 µm.

Furthermore, the powdery TiCN was a powdery TiCN produced by A.L.M.T. Corp and having a product type name of 5OR08, and a purity equal to or greater than 99.9 mass % and an average particle diameter, as measured in the Fsss method, of 0.8 µm.

Furthermore, the powdery ZrCN was a powdery ZrCN produced by A.L.M.T. Corp and having a product type name of 5OV25, and an average particle diameter, as measured in the Fsss method, of 2.0 µm to 3.0 µm.

Furthermore, the powdery HfCN was powder produced by way of trial by the Applicant and having an average particle diameter of 2.0-3.0 µm in the Fsss method.

Furthermore, the powdery NbC was Wako 1st Grade powdery NbC produced by Wako Pure Chemical Industries, Ltd. and having an average particle diameter of 1 µm to 3 µm.

The powdery TaC was a powdery TaC produced by Kojundo Chemical Laboratory Co., Ltd., and having a purity of 99% and an average particle diameter of 2 µm.

Furthermore, the powdery VC was a powdery VC produced by A.L.M.T. Corp and having a product type name of OR10, and an average particle diameter, as measured in the Fsss method, of 1.2 µm or less.

Subsequently, these powdery materials were mixed together in a mortar at a prescribed ratio to prepare a powdery mixture, and a uniaxial press was used to compress the mixture at a temperature of 20° C. with a compaction pressure of 294 MPa applied to obtain a compact.

Subsequently, the obtained compact was heated in a hydrogen atmosphere (under the atmospheric pressure) at a temperature of 1900° C. or 2000° C. to obtain a sintered compact having a relative density of 90% or more.

Furthermore, the sintered compact was subjected to an HIP process at a processing temperature of 1600° C. in an Ar atmosphere with a pressure of 202.7 MPa applied to complete a heat-resistant tungsten alloy having a relative density of approximately 99%.

Of heat-resistant tungsten alloys thus produced, a sample having a composition of W—3 mass % of TiCN—1 mass % of NbC (sintering temperature: 2000° C. or 1900° C.) and a sample having a composition of W—3 mass % of TiCN—1 mass % of HfC (sintering temperature: 1900° C.) had their structures subjected to an observation via an electron microscope and a composition analysis via EPMA. The measurement was done under the following conditions:

Conditions for line analysis by EPMA
Equipment: EPMA1720H (made by Shimadzu Corporation)
Acceleration voltage: 15 kV
Beam current: 20 nA
Beam size: 1 µm
Measurement magnification: 5000 times
Reset time: 20 s/point An image of the sample having the composition of W—3 mass % of TiCN—1 mass % of HfC (sintering temperature: 1900° C.) as obtained via an electron microscope is each shown in FIG. 9, respectively.

Furthermore, the above sample's observed structural composition is shown in table 6. Note that the composition as referred to herein indicates a ratio of W, Ti, Nb, C and N in each structure.

TABLE 6

| mass % | W | Ti | Nb | C | N |
|---|---|---|---|---|---|
| first phase | 85-95 | 0-1 | 0-1 | 1-10 | 0-5 |
| second phase | 30-90 | 10-50 | 0-15 | 1-20 | 0-20 |
| third phase | 30-90 | 0-30 | 10-40 | 1-20 | 0-10 |
| fourth phase | 70-90 | 1-10 | 1-10 | 1-20 | 0-10 |

Figure 9:
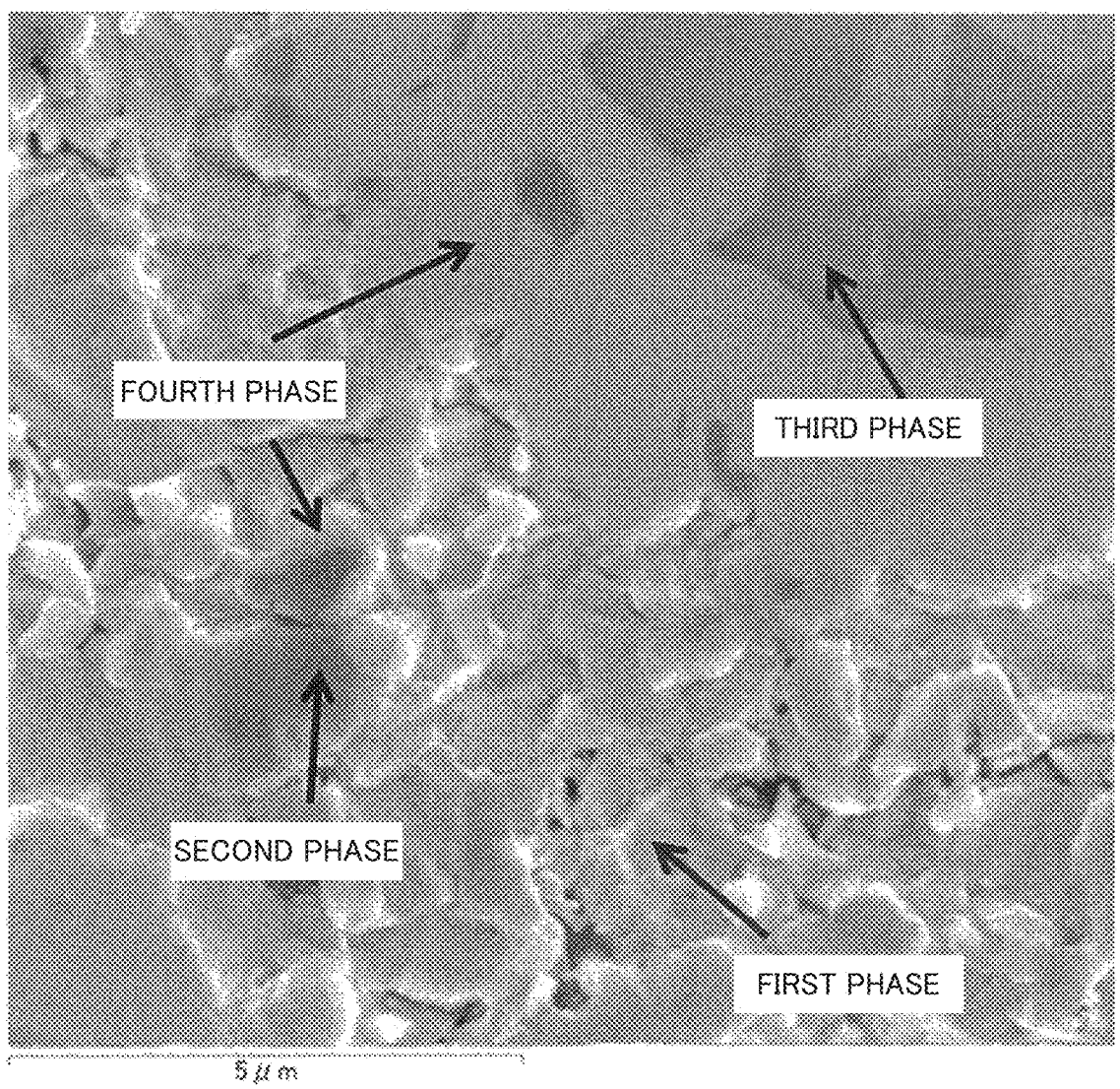
FIG. 9 is a schematic of an enlarged photograph of a cross section of a heat-resistant tungsten alloy according to a reference example of the present invention.

As shown in FIG. 9 and table 6, in the sample, in addition to first phase 1, second phase 2 and third phase 3, another phase was observed around second phase 2 and third phase 3.

This phase's composition was an intermediate composition between the composition of first phase 1 and that of second phase 2 or third phase 3, and has thus been found to correspond to fourth phase 4.

Subsequently, the same composition was used to also produce a sample sintered at 2000° C., and in this sample the phase corresponding to fourth phase 4 was not observed. Accordingly, it is believed that lowered sintering temperature helps fourth phase 4 to appear.

(Reference Example 3)

W—TiCN—NbC was selected as a composition, and TiCN was added in an amount of 3 mass % and NbC was added in an amount of 0.1-1 mass % and sintering was done at 2000° C., and the other conditions were similar to those in reference example 2 to produce a heat-resistant tungsten alloy, and the alloy was measured for room temperature hardness and high temperature strength under the same conditions as reference example 1 and reference example 2. The result is shown in table 7.

TABLE 7

W—TiCN—NbC composition's amount of NbC added and physical properties (sintered at 2000° C.)

| Nb content (mass %) | 0.09 | 0.27 | 0.44 | 0.89 |
|---|---|---|---|---|
| (amount of NbC added (mass %)) | 0.1 | 0.3 | 0.5 | 1 |
| room temperature hardness (Hv) | 537 | 552 | 569 | 580 |
| 0.2% proof stress (MPa) | 953 | 949 | 958 | 950 |
| bending strength (MPa) | | full bend | | |
| amount of flexure at fracture (mm) | | full bend | | |

INDUSTRIAL APPLICABILITY

While the present invention has thus been described based on embodiments and examples, the present invention is never limited to the above embodiment.

A skilled artisan would as a matter of course conceive of a variety of variations and improvements in the scope of the present invention and these are also understood as belonging to the scope of the present invention.

For example while in the above embodiments a case where the heat-resistant tungsten alloy is applied to a friction stir welding tool has been described, the present invention is not limited thereto at all, and is applicable to a glass melting jig and tool, a member for a high temperature industrial furnace, a hot extrusion die, a piercer plug for a seamlessly produced pipe, an injection molding hot runner nozzle, a casting insert mold, a container for resistance heating vapor deposition, an aircraft jet engine, a rocket engine, and other heat-resistant members used in a high temperature environment.

REFERENCE SIGNS LIST

1: First Phase
2: Second Phase
3: Third Phase
4: Fourth Phase
11: Sample Piece
13: Pin
15: Head
101: Friction Stir Welding Tool
102: Shank
103: Shoulder
104: Pin

The invention claimed is:

1. A heat-resistant tungsten alloy having a first phase containing metal W, wherein W is the largest in content (mass %) of the first phase a second phase having metal W, and a carbonitride of at least one element of Ti, Zr and Hf, wherein W and the carbonitride are two most abundant components by mass % of the second phase, and a third phase having metal W, and a carbide of at least one element of group 5A elements in the periodic table, wherein W and the carbide are two most abundant components by mass % of the third phase, the heat-resistant tungsten alloy being either without iron group metal, or having iron group metal as an inevitable impurity, wherein the first phase, the second phase, and the third phase have an average crystal grain size of 0.1 µm or more and 10 µm or less.

2. The heat-resistant tungsten alloy according to claim 1, having a Vickers hardness of 190 Hv or more at 1000° C.

3. The heat-resistant tungsten alloy according to claim 1, containing a carbonitride of at least one element of Ti, Zr, Hf in an amount of 5 volume % or more and 25 volume % or less.

4. The heat-resistant tungsten alloy according to claim 1, wherein the group 5A element of the periodic table is at least one of V, Nb and Ta, and a carbide of at least one element of V, Nb, Ta is contained in an amount of 0.5 volume % or more and 15 volume % or less in total.

5. The heat-resistant tungsten alloy according to claim 1, wherein the carbonitride of at least one element of Ti, Zr and Hf is in an amount of 2 volume % or more and 25 volume % or less.

6. A friction stir welding tool having the heat-resistant tungsten alloy according to claim 1.

7. A friction stir welding device having the friction stir welding tool according to claim 6.

8. A method for producing the heat-resistant tungsten alloy according to claim 1, comprising:
(a) mixing powdery W, a powdery carbonitride, and a carbide containing a group 5A element together;
(b) compacting at room temperature a powdery mixture obtained in the (a); and
(c) heating a compact obtained in the (b) in an atmosphere of atmospheric pressure at 1800° C. or more and 2000° C. or less to sinter the compact.

* * * * *